US 9,354,622 B2

(12) United States Patent
Masson et al.

(10) Patent No.: US 9,354,622 B2
(45) Date of Patent: May 31, 2016

(54) METHOD OF CONTROLLING A ROTATING ELECTRIC MACHINE, CONTROL SYSTEM AND ROTATING ELECTRIC MACHINE CORRESPONDING THERETO

(75) Inventors: Philippe Masson, Yerres (FR); Thierry Mandion, Champagne sur Seine (FR); Damien Chaumat, Saint Maur des Fosses (FR)

(73) Assignee: Valeo Equipements Electriques Moteur (FR)

( * ) Notice: Subject to any disclaimer, the term of this patent is extended or adjusted under 35 U.S.C. 154(b) by 464 days.

(21) Appl. No.: 14/117,202

(22) PCT Filed: Apr. 19, 2012

(86) PCT No.: PCT/FR2012/050853
§ 371 (c)(1),
(2), (4) Date: Jul. 9, 2014

(87) PCT Pub. No.: WO2012/172216
PCT Pub. Date: Dec. 20, 2012

(65) Prior Publication Data
US 2014/0343739 A1    Nov. 20, 2014

(30) Foreign Application Priority Data

May 10, 2011   (FR) .................................. 11 54008

(51) Int. Cl.
*H02P 9/10*   (2006.01)
*H02P 9/14*   (2006.01)
(Continued)

(52) U.S. Cl.
CPC  *G05B 15/02* (2013.01); *H02P 9/10* (2013.01); *H02P 9/105* (2013.01); *H02P 9/48* (2013.01); *H02P 2101/45* (2015.01)

(58) Field of Classification Search
USPC ....................................................... 322/21, 68
See application file for complete search history.

(56) References Cited

U.S. PATENT DOCUMENTS 5,739,677 A * 4/1998 Tsutsui ................... H02J 7/242
                                                  322/20
8,513,924 B2 * 8/2013 Horihata ................. H02P 9/30
                                                  322/20
(Continued)

FOREIGN PATENT DOCUMENTS

EP    1443623    8/2004
FR    2874765    3/2006
(Continued)

OTHER PUBLICATIONS

D.J. Perreault: 'A New Design for Automotive Alternators' 2000 International Congress on Transportation Electronics (Convergence 2000), Detroit, MI Oct. 2000, pp. 583-594.

*Primary Examiner* — Pedro J Cuevas
(74) *Attorney, Agent, or Firm* — Berenato & White, LLC

(57) ABSTRACT

The method of controlling a polyphase rotating electric machine, the machine operating as a generator and being linked to an electrical network (1), is of the type of those consisting in short-circuiting at least one phase winding in the event of load shedding. A short-circuit command (SAND) is generated for the phase winding when a first measurement voltage V of a voltage B+ of the network exceeds a first predetermined threshold value V1 and when a phase current (IΦ) in the phase winding vanishes and changes direction. The first measurement voltage V may be obtained by filtering the voltage B+ of the network with a predetermined time constant TF.

16 Claims, 6 Drawing Sheets

(51) Int. Cl.
  *G05B 15/02* (2006.01)
  *H02P 9/48* (2006.01)
  *H02P 11/00* (2006.01)
  *H02P 101/45* (2015.01)

(56) References Cited

U.S. PATENT DOCUMENTS

| | | | | |
|---|---|---|---|---|
| 8,541,988 | B2* | 9/2013 | Horihata | H02J 7/1461 |
| | | | | 322/21 |
| 8,547,071 | B2* | 10/2013 | Horihata | H02P 9/006 |
| | | | | 322/21 |
| 2011/0204856 | A1* | 8/2011 | Horihata | H02P 9/30 |
| | | | | 322/27 |
| 2012/0001598 | A1* | 1/2012 | Horihata | H02P 9/006 |
| | | | | 322/21 |
| 2012/0007568 | A1* | 1/2012 | Horihata | H02J 7/1461 |
| | | | | 322/21 |
| 2015/0012161 | A1* | 1/2015 | Kanekawa | H02M 1/32 |
| | | | | 701/22 |

FOREIGN PATENT DOCUMENTS

FR 2950755 4/2011
JP 2002010694 1/2002

* cited by examiner

METHOD OF CONTROLLING A ROTATING ELECTRIC MACHINE, CONTROL SYSTEM AND ROTATING ELECTRIC MACHINE CORRESPONDING THERETO

CROSS-REFERENCE TO RELATED APPLICATIONS AND CLAIM TO PRIORITY

This application is a national stage application of International Application No. PCT/FR2012/050853 filed Apr. 19, 2012, which claims priority to French Patent Application No. 11/54008 filed May 10, 2011, of which the disclosures are incorporated herein by reference and to which priority is claimed.

TECHNICAL FIELD OF THE INVENTION

The present invention relates to a method for controlling a polyphase rotary electrical machine which is connected to an electrical network, in particular an on-board network of a motor vehicle, in the event of load dump, as well as a control system which is designed for the implementation of this method.

The invention also relates to a rotary electrical machine comprising this control system.

TECHNOLOGICAL BACKGROUND OF THE INVENTION

In a motor vehicle, this on-board network is used to supply the various items of electrical equipment with which the vehicle is equipped. The supply is provided by at least one battery. The battery is recharged by means of a rotary electrical machine, by energy supplied by the rotation of the thermal engine of the vehicle. Rotary electrical machine means more generally any polyphase rotary electrical machine which is used for the production of direct output current which supplies the on-board network. In particular it can be an alternator or an alternator-starter.

In the event of sudden disconnection of an electric load of the on-board network, or of a battery, or both, a load dump phenomenon is created which gives rise to excess voltage on the on-board network. In fact, since regulation of a current inductor in the machine cannot act rapidly enough after the load dump, the machine continues to supply the same output current, whereas the current consumption of the on-board network side has dropped.

Conventionally, the vehicle battery is a 14 V battery. In principle, because of its low internal resistance, it limits to approximately 17 V the voltage peaks which occur on the vehicle on-board network in the event of load dump. This battery thus absorbs the small excess voltages. Nevertheless, in the event of disconnection of the battery (as a result of breakage of a supply cable, for example), a very high excess voltage can occur on the on-board network. In fact, since the inductor current of the machine cannot be turned off instantaneously, the latter generates an electromotive force and a current which are proportional respectively to the speed of the machine and to the inductor current. This electromotive force then charges the set of condensers which are connected to the on-board network, and consequently increases substantially the direct voltage on the on-board network.

In a known technique, the on-board network voltage is limited to a maximum of 32 V by the rectifier bridge of the machine, with the semiconductors which are not conducting the phase current going alternately into Zener diode mode.

This excess voltage is liable to damage the electrical equipment which is supplied by the on-board network. This is why all the electrical equipment of the vehicle has dimensions such as to withstand a maximum voltage of approximately 32 V, which corresponds to excess voltage of approximately 20 V.

Various solutions are known which make it possible to limit the voltage on the on-board network to an admissible maximum voltage, i.e. the highest voltage which the electrical equipment of the vehicle can withstand without any risk of damage.

The solution described in the article: "A New Design for Automotive Alternators", by D. J. Perreault et al, published in the proceedings of the Congress "2000 International Congress on Transportation Electronics (Convergence 2000)", Detroit, Mich., October 2000, pp. 583-594, consists of blocking in the conducting state at least one of the switching transistors of a cut-off rectifier. By this means, at least one of the phase windings is short-circuited. The short-circuit is maintained, and the excitation of the machine is reduced until the voltage has returned to an acceptable level.

This simple method of elimination of the transient phenomena has disadvantages however:

the supply to the equipment connected to the on-board network is not guaranteed because the excitation is not maintained;
the electrical and thermal protection of the semiconductor elements of the rectifier circuit is not ensured.

GENERAL DESCRIPTION OF THE INVENTION

The object of the present invention is thus to eliminate these disadvantages.

Its object is specifically a method for controlling a rotary electrical machine which operates as a generator, and is connected to an electrical network, of the type consisting of short-circuiting at least one phase winding in the event of load dump.

This method is distinguished in that a command to short circuit the phase winding is generated when a first measurement V of a voltage $B^+$ of the network exceeds a first predetermined threshold value V1, and a phase current in the phase winding vanishes and changes direction.

According to a particular characteristic of the invention, the first voltage V is also highly advantageously obtained by filtering of the voltage $B^+$ of the network with a predetermined time constant $T_F$.

The stoppage of this short-circuit command is preferably authorised when the first measurement V becomes lower than a second predetermined threshold value V2 which is lower than the first predetermined threshold value V1, during at least a first predetermined time T1.

Alternatively, the stoppage of the short-circuit command is advantageously authorised if a duration of this command becomes longer than a second predetermined time T2 shorter than a first period necessary for detection of a phase fault by a regulation device of the machine.

Advantage is derived from the fact that the short-circuit command is inhibited during a third predetermined time T3, if the duration of the short-circuit command becomes longer than the second predetermined time T2, this third predetermined time T3 being longer than a second period necessary for re-initialisation of the regulation device of the machine.

According to the method of the invention, the phase winding is preferably short-circuited by means of a semiconductor element controlled by the short-circuit command, and a variation of the phase current is detected by means of a second measurement Vds corresponding to the voltage drop at the terminals of this element.

It is considered advantageously that the phase current changes direction when the second measurement Vds becomes lower than a third predetermined threshold value V3, or higher than a fourth predetermined threshold value V4.

In this embodiment, this semiconductor element is preferably a commutator of a synchronous rectifier circuit, and this commutator is controlled simultaneously by the short-circuit command and by an automatic control command of the synchronous rectifier circuit.

The invention also relates to a control system of a polyphase rotary electrical machine which operates as a generator, and is connected to an electrical network, which system can implement the method previously described.

This machine comprises in a known manner:
- a rectifier circuit with a plurality of branches, each comprising at least one switch which is connected to a phase winding, which can supply the electrical network with an output voltage $B^+$;
- an electronic control and regulation circuit which opens or closes this switch by means of an automatic control command.

The control system according to the invention is distinguished in that it comprises a control block which is associated with this switch, and generates a switching signal which closes the switch when the first measurement V of the voltage $B^+$ exceeds a first predetermined threshold value V1, and a phase current in the winding vanishes and changes direction.

According to a particular characteristic, the control system according to the invention additionally advantageously comprises a module for filtering of the said output voltage with a predetermined time constant $T_F$.

This control block preferably comprises a module for detection of excess voltage which generates an excess voltage signal representative of the presence of an excess voltage on the network throughout the duration of the time constant $T_F$.

This control block advantageously comprises a module for detection of passage through zero which generates a signal of passage through zero representative of the vanishing of the said phase current.

In this embodiment, the control block highly advantageously additionally comprises:
- an AND logic gate which generates a short-circuit command at the output on the basis of the excess voltage signal and the signal of passage through zero at the input;
- a validation module, which generates a validated short-circuit command, by authorizing the stoppage of, or inhibiting, the short-circuit command, on the basis of a second predetermined time T2 which is shorter than a first period necessary for detection of a phase fault by the electronic control and regulation circuit, and on the basis of a third predetermined time T3 which is longer than a second period necessary for re-initialisation of the electronic control and regulation circuit;
- an OR logic gate which generates the switching command at the output on the basis of the validated short-circuit command and the automatic control command.

This validation module preferably comprises a counter with a counting period which is equal to the second predetermined time T2 and a countdown counter with a countdown period equal to the third predetermined time T3.

Benefit is derived from the fact that the control block additionally comprises a memory comprising instructions which are representative of the method according to the invention.

The invention also relates to a polyphase rotary electrical machine which can operate as a generator, and is distinguished in that it comprises the above described control system.

These few essential specifications will have made apparent to persons skilled in the art the advantages provided by the invention in comparison with the prior art.

The detailed specifications of the invention are given in the following description which is provided in association with the appended drawings. It should be noted that the purpose of these drawings is simply to illustrate the text of the description, and that they do not constitute in any way a limitation of the scope of the invention.

Figure 5:
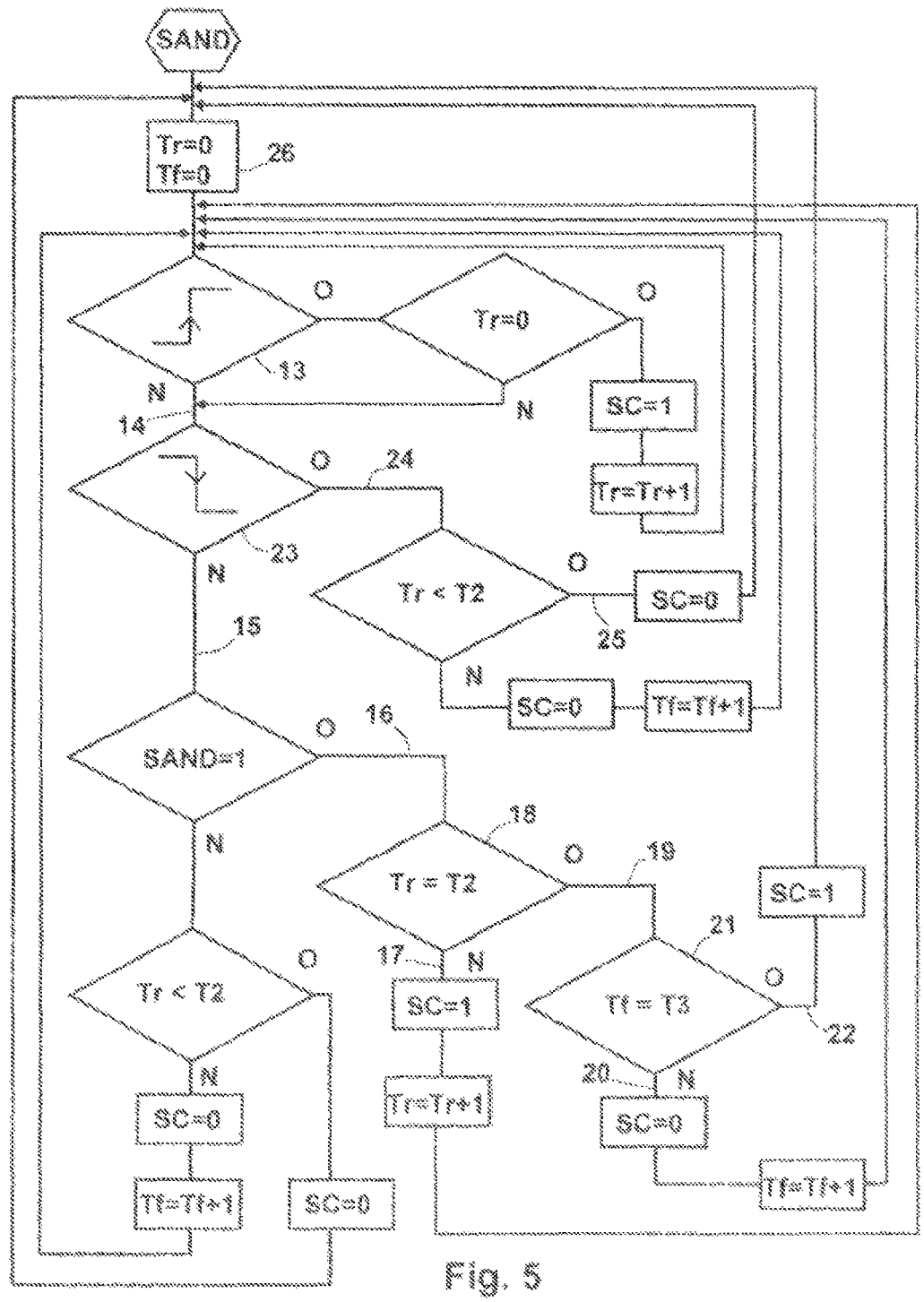
FIG. 5 is a flow chart showing the operating principle of a validation module contained in the control block shown in FIG. 2.
Figure 7:
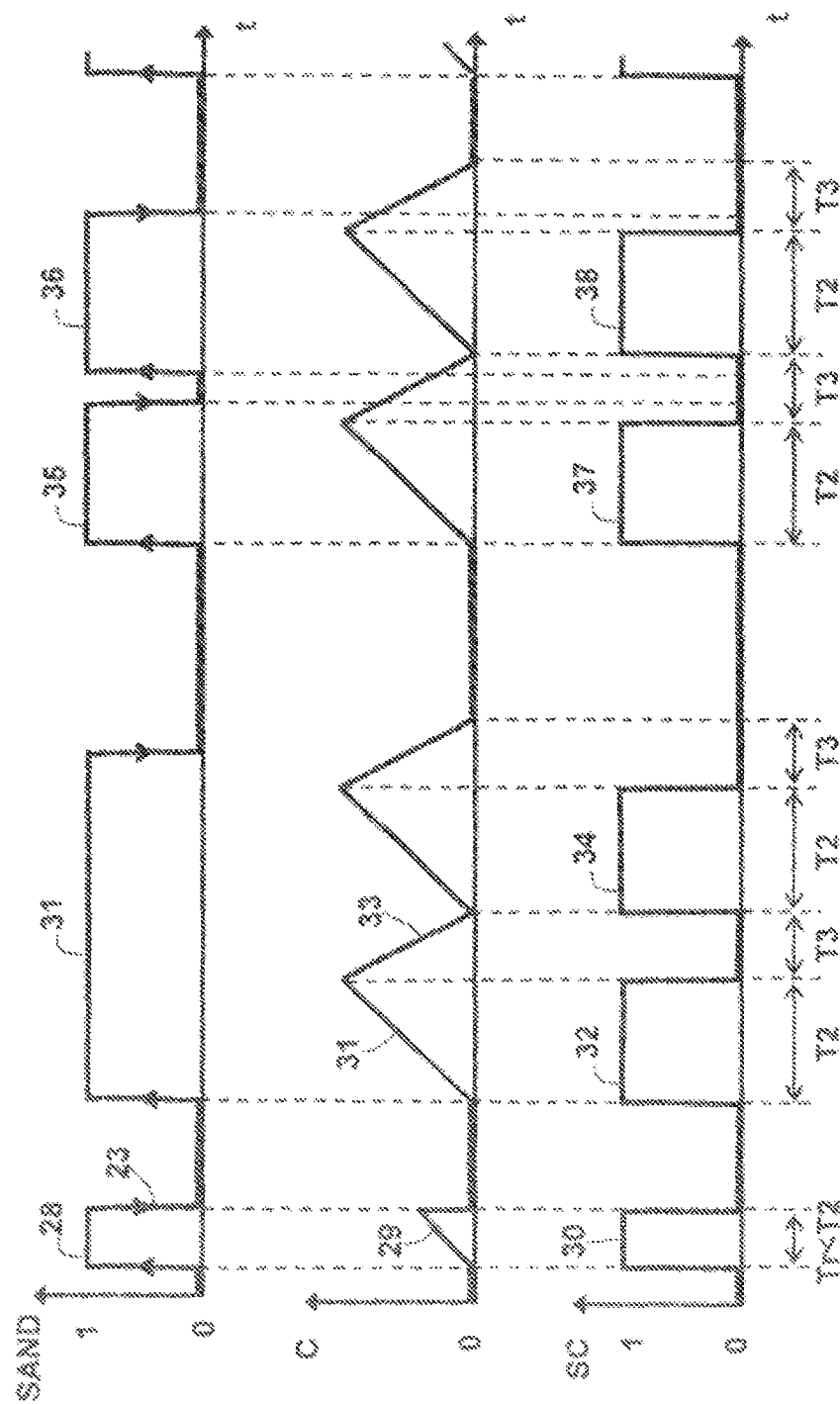

The timing diagrams in FIG. 7 show the validation, the stoppage and the inhibition of the short-circuit command by the validation module according to the operating principle shown in FIG. 5.

DESCRIPTION OF PREFERRED EMBODIMENTS OF THE INVENTION

The preferred embodiments of the invention preferably correspond to a polyphase rotary electrical machine of the alternator or alternator starter type, which supplies an on-board electrical network 1 connected to a battery 2.

Figure 1:
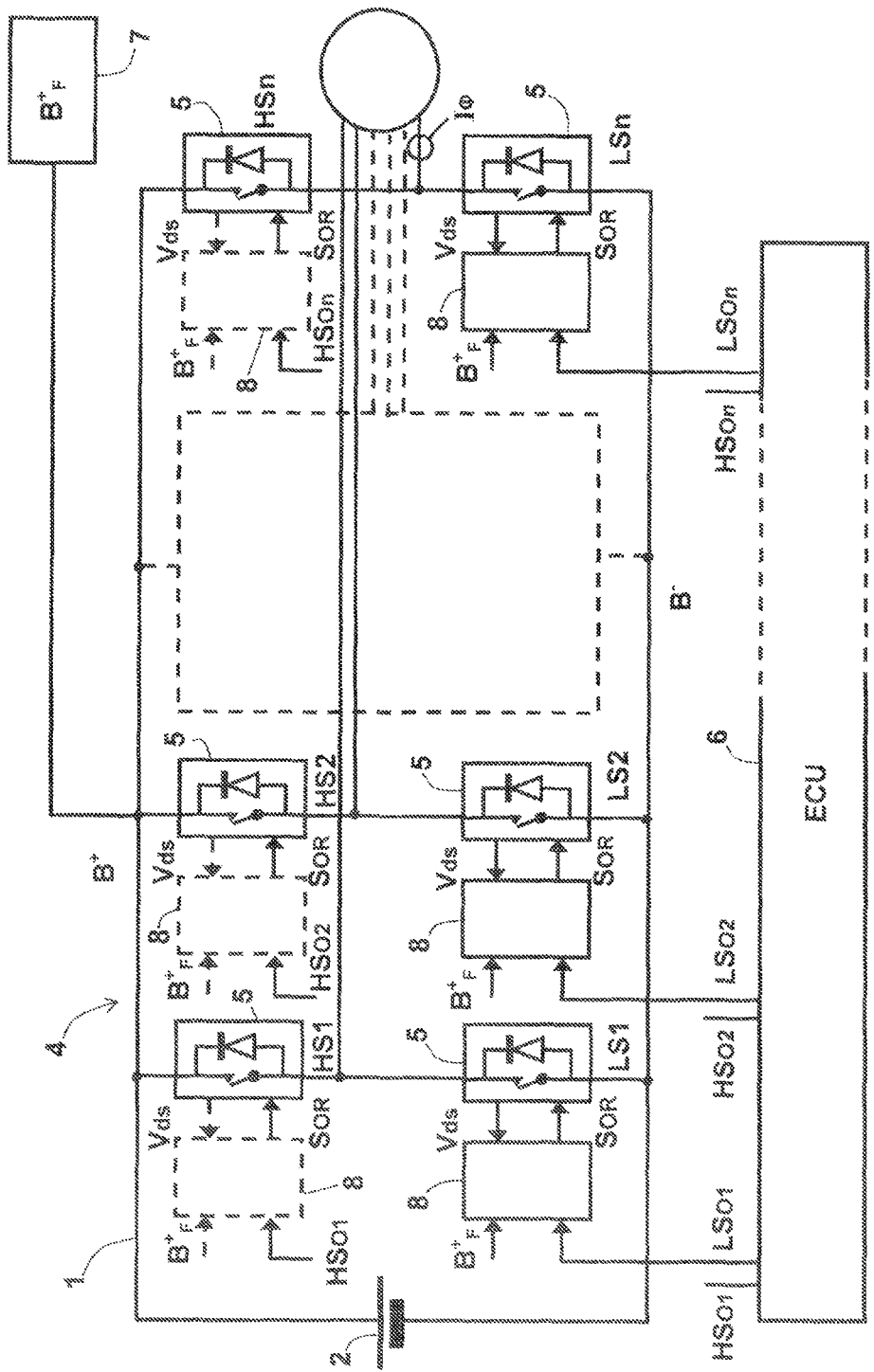
FIG. 1 is a process diagram of a control system of a polyphase rotary electrical machine operating as a generator, according to the invention.

The machine in question preferably has a number n of the phase windings provided with a synchronous rectifier circuit with semiconductors 4 as represented in FIG. 1 (n is preferably equal to 3, but can also be equal to 1).

According to a known arrangement, the synchronous rectifier circuit 4 has branches each comprising switches 5 which can be controlled, and connect the phase windings 3 firstly to the positive pole $B^+$ of the battery 2 (commutators HS1, HS2, HSn of the high side), and secondly to the negative pole $B^-$ of the battery 2 (commutators LS1, LS2, LSn of the low side).

In normal operation of the generator, an electronic control and regulation unit 6 closes and opens the high side and low side commutators 5 alternately according to a known operating mode of a synchronous rectifier 4, by means of automatic control commands HSO1, LSO1, HSO2, LSO2, HSOn, LSOn.

In the event of excess voltage on the on-board network 1, one or a plurality of phase windings 3 is/are short-circuited, simultaneously or synchronously.

The short-circuit is carried out equally well by controlling either the low side switches LSO1, LSO2, LSOn (short-circuit of n phases relative to the potential B⁻), or the high side switches HSO1, HSO2, HSOn (short-circuit of n phases relative to the potential B⁺).

The voltage used for the detection of excess voltage is the voltage B⁺, which is filtered by means of a filtering module 7 in order to be free from the voltage wave caused by the rectification, and in order to prevent untimely short-circuiting of the "n" phases of the machine. This voltage is known as $B^+_F$. The time taken into account associated with the filtering, i.e. the time constant of the filter, is known as $T_F$.

According to the structure of the system, this first measurement V is:

Single. In this case, the switching command of the "n" components which can be controlled is virtually synchronous.

Plural. In this case, the switching command of the "n" components which can be controlled is asynchronous, and depends both on the structure of the system and on the tolerances of the components which permit the "n" detections of excess voltage which the system comprises.

According to the method of the invention, the short-circuit is commanded when the first measurement V exceeds a first predetermined threshold value V1, and a phase current in the corresponding phase winding vanishes and changes direction.

Figure 2:
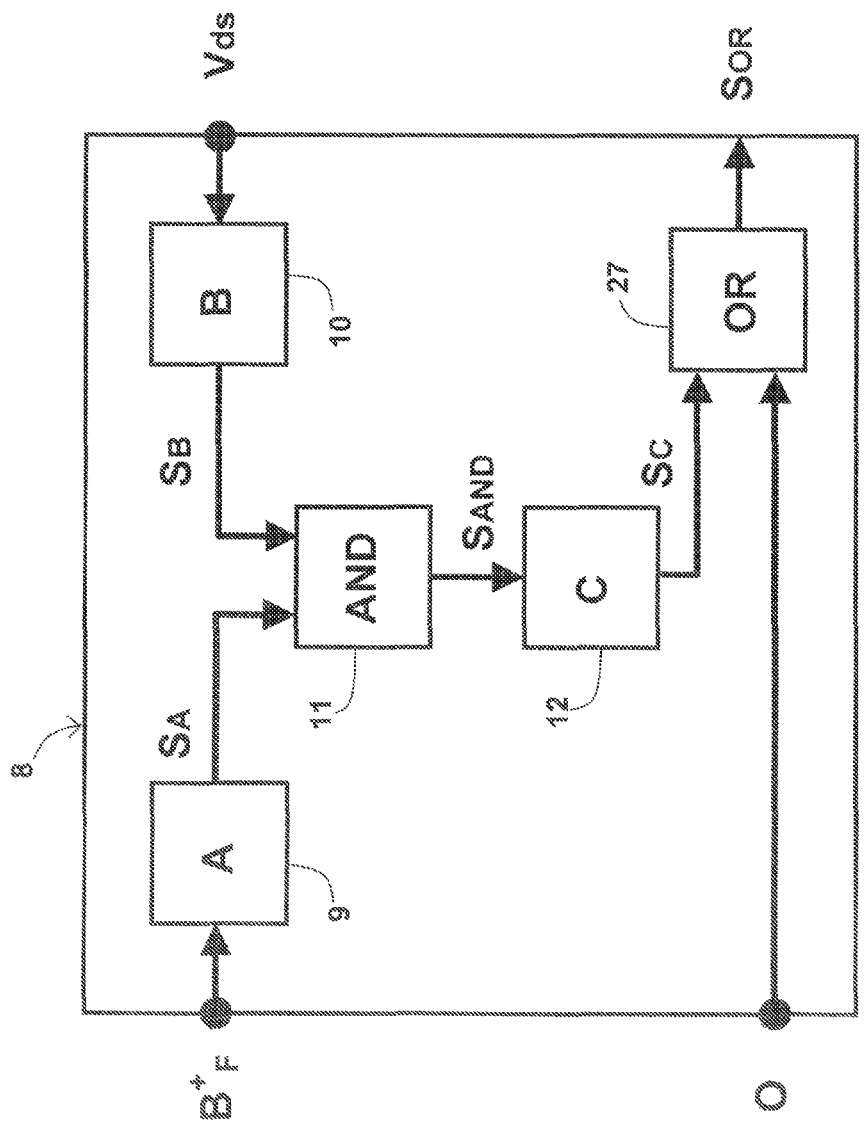
FIG. 2 is a process diagram of a control block of the control system according to the invention shown in FIG. 1.

As shown in FIG. 1, the switching command SOR of each switch 5 is produced by a control block 8, the details of which are represented in FIG. 2.

It will be appreciated that only the low-side control blocks 5 or the high-side control blocks 5 (represented in broken lines) exist, depending on whether the short-circuiting of the phase windings 3 is carried out relative to B⁻ or B⁺, respectively.

This control block 8 comprises a module for detection of excess voltage 9 which generates an excess voltage signal SA.

Figure 3:
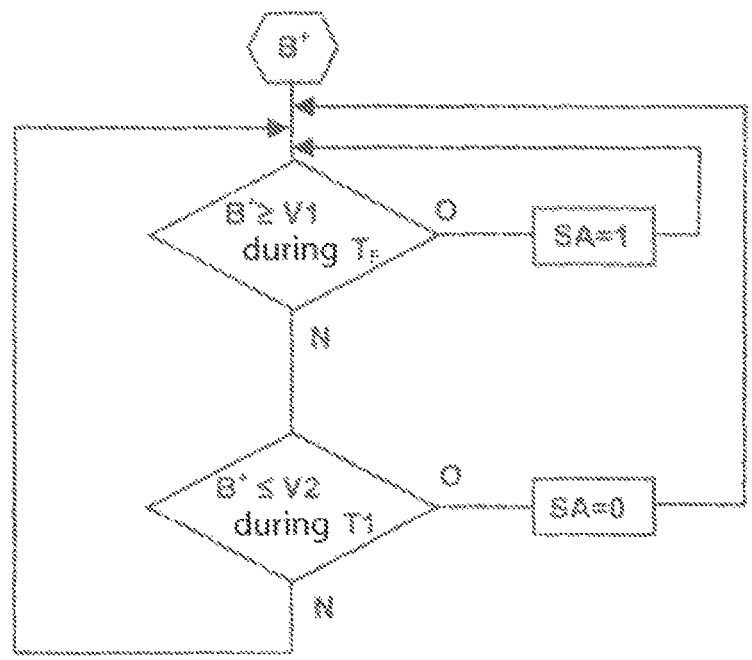
FIG. 3 is a flow chart showing the operating principle of a module for detection of excess voltage contained in the control block shown in FIG. 2.

The operating principle of this detection module is represented in FIG. 3:

the excess voltage signal SA is set to 1 when the voltage B⁺ becomes equal to, or greater than, a first predetermined threshold value V1 during $T_F$, which is equivalent to comparing the first measurement V of the filtered voltage $B^+_F$ with this threshold;

the excess voltage signal SA is set to 0 when the voltage $B_+$ becomes equal to, or lower than, a second predetermined threshold value V2 during a first predetermined time T1.

The control block 8 also comprises a module for detection of passage through zero 10 of the phase current Iφ, which generates a signal of passage through zero SB.

Several methods can be used to detect the variation of the phase current Iφ, and in particular direct measurement of the phase current Iφ.

Preferably, the block for detection of passage through zero 10 uses a second measurement Vds of a voltage drop at the terminals of the switch 5 which is being controlled.

Figure 4:
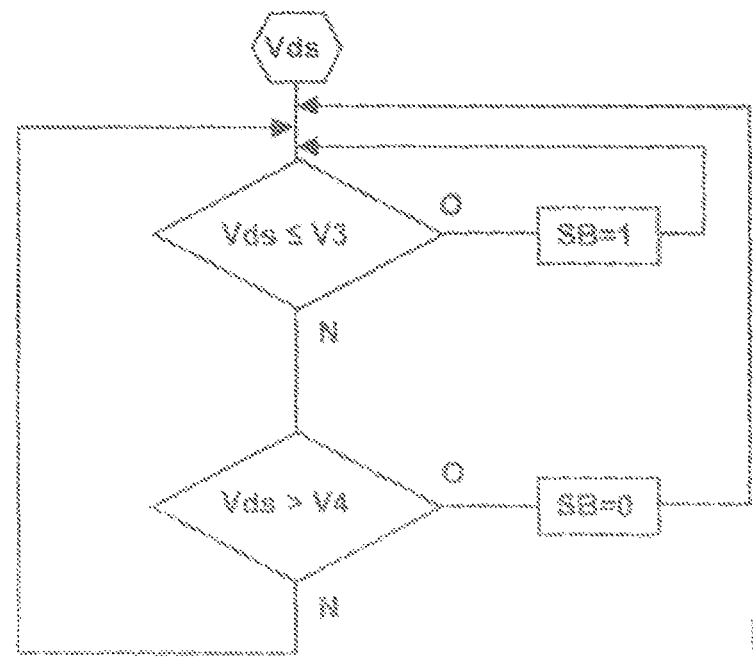
FIG. 4 is a flow chart showing the operating principle of a module for detection of passage through zero contained in the control block shown in FIG. 2.

According to the operating principle shown in FIG. 4, when the second measurement Vds becomes equal to, or lower than a third predetermined threshold value V3 (the value of V3 is close to zero), it is considered that the direction of the current is becoming inverted in order to circulate in the diode of the switch 5, and the signal of passage through zero SB is set to 1. When the second measurement Vds becomes greater than a fourth predetermined threshold value V4, the signal of passage through zero SB is on the other hand set to 0.

As previously stated, the general principle of the invention consists of generating a short-circuit command SAND of a phase winding 3 when an excess voltage V is detected on the on-board network 1, and when the phase current hp vanishes and changes direction.

As shown clearly in FIG. 2, the control block 8 thus comprises an AND logic gate 11 which generates this short-circuit command SAND from the excess voltage signal SA and from the signal of passage through zero SB at the input.

For the purpose of eliminating the disadvantages of the devices which limit the effects of a load dump known in the prior art, this short-circuit command SA is not applied directly to the switch 5.

This short-circuit command SAND is validated, stopped or inhibited according to the method of the invention by a validation module 12 of the control block 8.

The validation module 12 generates a validated short-circuit command SC from the short-circuit command SAND, according to a complex algorithm shown in FIG. 5.

The purpose of this algorithm is to avoid false detections of a "phase fault" by the device for regulation of the output voltage B⁺ of the machine by limiting the duration of the short-circuit command SAND to a second predetermined time T2. This second predetermined time T2 is shorter than a first period necessary for detection of this fault by the regulation device.

For this purpose, the validation module 12 comprises a counter which is triggered by the rising front 13 of the short-circuit command SAND after initialisation. The validated short-circuit command Sc is set to 1 for as long as a first counting time Tr is shorter than the second predetermined time T2, and the short-circuit command SAND remains at the level 1 (path 14, 15, 16 and 17 in FIG. 5).

When the duration of the short-circuit command reaches T2, i.e. when the equality of the counting time Tr and T2 is detected 18 by the counter, the short-circuit command SAND is stopped, and the validated short-circuit command SC is set to 0 (see path 14, 15, 16, 19 and 20).

In order to allow the device for regulation of the machine to be re-initialised correctly after the forcing to 0 of the validated short-circuit command SC, the short-circuit command SAND is inhibited during a third predetermined time T3. This third predetermined time T3 is longer than a second period necessary for the re-initialisation.

For this purpose, the validation module 12 comprises a countdown counter which is triggered at the end of the counting time Tr, i.e. T2. For as long as the countdown time Tf is shorter than T3, the validated short-circuit command SC is maintained at the level 0, even if the short-circuit command SAND is at the level 1 (see path 14, 15, 16, 19 and 20).

When the equality of the countdown time Tf and T3 is detected 21 by the countdown counter, the short-circuit command SAND is validated, and the validated short-circuit command SC is set to 1 if the short-circuit command SAND is at the level 1 (see path 14, 15, 16, 19 and 22).

If the short-circuit command SAND goes to the level 0 (descending front 23) before the end of the counting Tr, the validated short-circuit command SC goes immediately to 0 (path 24, 25), and the counter and the countdown counter are reinitialised 26.

The counter and the countdown counter are also reinitialised 26 at the end of the countdown time, i.e. when Tf is equal to T3 (path 14, 15, 16, 19 and 22).

An OR logic gate 27 of the control block 8 superimposes the validated short-circuit command SC on the automatic control command O obtained from the electronic control and regulation unit 6, in order to generate the switching command SOR applied to the switches 5.

Figure 6A:
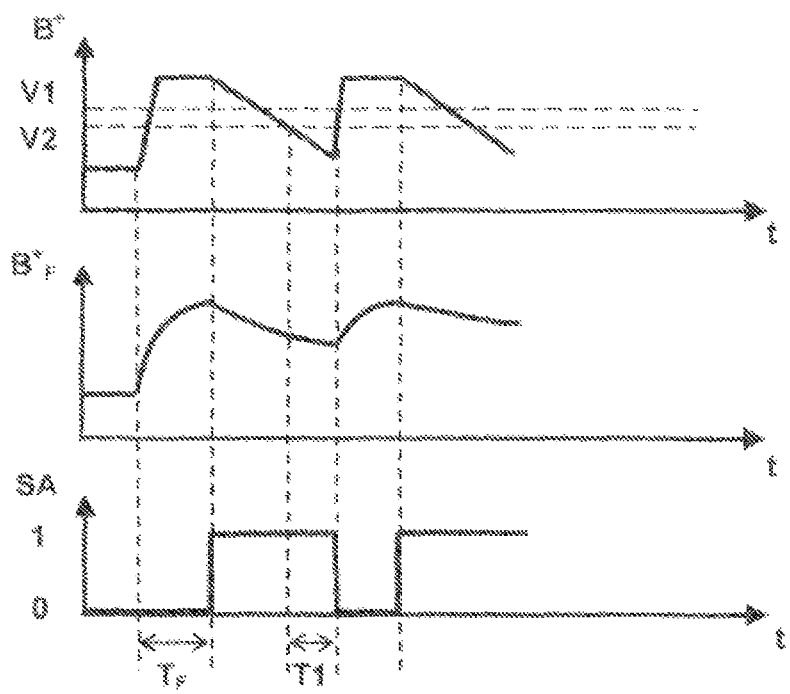
FIGS. 6a and 6b represent the development over a period of time of the voltage of the on-board network in the event of load dump, the development of this filtered voltage, and the detection of the excess voltage, in the event where there are capacitive loads and in the event when all the loads are disconnected, respectively.
Figure 6B:
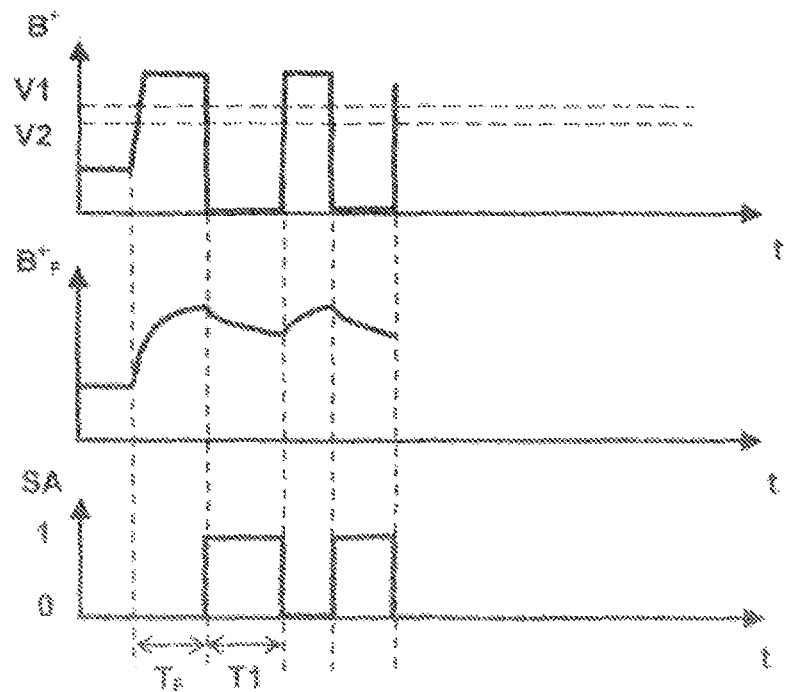

FIGS. 6*a*, 6*b* and 7 show examples of timing diagrams obtained from implementation of the above-described algorithms.

FIG. 6*a* shows the generation of the excess voltage signal SA from the network voltage B+ in the event when the load dump occurs on a network 1 with capacitive charges.

When the voltage B+ becomes greater than the first predetermined threshold value V1, the excess voltage SA is set to 1 only after the time of establishment of the filter TF. The excess voltage signal SA is set to 0 only if the voltage B+ becomes lower than the second predetermined threshold value V2 during the first predetermined time T1.

FIG. 6*b* shows in a similar manner the generation of the excess voltage signal SA from the network voltage B+ in the event when the load dump is produced by the disconnection of all the loads of the machine.

FIG. 7 shows clearly the effects of the validation module 12 on the short-circuit command SAND according to the duration of its high level.

For a high level 28 with a duration which is shorter than the second predetermined time T2, a descending front 23 occurs before the end of the counting 29. In this case, the validated short-circuit command SC has a high level 30 which is identical to the short-circuit command SAND.

For a high level 31 with a duration which is very much longer than the second predetermined time T2, the counting 31 interrupts the high level 32 of the validated short-circuit command SC at the end of the second predetermined time T2. The countdown 33 Re-establishes the high level 34 at the end of the third predetermined time T3.

For a high level 35 with a duration which is slightly longer than the second predetermined time T2, followed rapidly by another high level 36, the high level 37 of the validated short-circuit command SC is interrupted at the end of the second predetermined time T2, and is re-established 38 only after the third predetermined time T3.

In a known manner, the control blocks 8 are preferably produced by means of a microcontroller or a specific ASIC.

In the event of implementation by a microcontroller, a memory advantageously comprises the instructions which are representative of the algorithms shown in FIGS. 3, 4 and 5.

Advantage can be derived from implementation of the control blocks 8 by appropriate modification of an existing electronic control unit 6.

In order to improve the operation, it can be envisaged to authorise the stoppage of the short-circuit command SAND only when the current in the component controlled (low side (LSx) or high side (HSx) depending on the strategy selected) vanishes. This is in order to avoid the opening of the switch 5 when the value of the switched current is high. In fact, depending on the strategy selected (number of phases short-circuited simultaneously), the current imbalance can be such that the peak current value becomes very much higher than the value for which the size of the component is designed.

It will be appreciated that the invention is not limited simply to the above described preferred embodiments.

On the contrary, the invention thus incorporates all the possible variant embodiments which would remain within the context defined by the following claims.

The invention claimed is:

1. Method for controlling a polyphase rotary electrical machine which operates as a generator, and is connected to an electrical network (1), consisting of short-circuiting at least one phase winding (3) in the event of load dump, wherein a command (SAND) to short circuit said phase winding (3) is generated when a first measurement V of a voltage B+ of said network (1) exceeds a first predetermined threshold value V1, and a phase current (Iφ) in said phase winding (3) vanishes and changes direction.

2. Method for controlling a rotary electrical machine according to claim 1, characterized in that said first voltage V is obtained by filtering of said voltage B+ of said network (1) with a predetermined time constant TF.

3. Method for controlling a rotary electrical machine according to claim 1, characterized in that the stoppage of said short-circuit command (SAND) is authorized when said first measurement V becomes lower than a second predetermined threshold value V2 which is lower than said first predetermined threshold value V1, during at least a first predetermined time T1.

4. Method for controlling a rotary electrical machine according to claim 1, characterized in that the stoppage of said short-circuit command (SAND) is authorized if a duration of said short-circuit command (SAND) becomes longer than a second predetermined time T2 shorter than a first period necessary for detection of a phase fault by a regulation device of said machine.

5. Method for controlling a rotary electrical machine according to claim 4, characterized in that said short-circuit command (SAND) is inhibited during a third predetermined time T3, if said duration of said short-circuit command (SAND) becomes longer than said second predetermined time T2, said third predetermined time T3 being longer than a second period necessary for re-initialization of said regulation device of said machine.

6. Method for controlling a rotary electrical machine according to claim 1, characterized in that said phase winding (3) is short-circuited by means of a semiconductor element (5) controlled by said short-circuit command (SAND, SC), and variation of said phase current (Iφ) is detected by means of a second measurement Vds corresponding to a voltage drop at the terminals of said element (5).

7. Method for controlling a rotary electrical machine according to the preceding claim 6, characterized in that it is considered that said phase current (Iφ) changes direction when said second measurement Vds becomes lower than a third predetermined threshold value V3, or higher than a fourth predetermined threshold value V4.

8. Method for controlling a rotary electrical machine according to claim 6, characterized in that said semiconductor element (5) is a commutator of a synchronous rectifier circuit (4), and in that said commutator (5) is controlled simultaneously by said short-circuit command (SAND, SC) and by an automatic control command (O) of said synchronous rectifier circuit (4).

9. Control system of a polyphase rotary electrical machine which operates as a generator, and is connected to an electrical network (1), which system can implement the method according to claim 1, said machine comprising:
    a rectifier circuit (4) with a plurality of branches, each comprising at least one switch (5) which is connected to a phase winding (3), which can supply said electrical network (1) with an output voltage B+;
    an electronic control and regulation circuit (6) which opens or closes said switch (5) by means of an automatic control command (O), and
    a control block (8) which is associated with said switch (5), and generates a switching signal (SO) which closes said switch (5) when a first measurement V of said voltage B+ exceeds a first predetermined threshold value V1, and a phase current (Iφ) in said phase winding (3) vanishes and changes direction.

10. Control system of a rotary electrical machine according to claim 9, characterized in that it additionally comprises a module (7) for filtering of said output voltage B+ with a predetermined time constant TF.

11. Control system of a rotary electrical machine according to claim 10, characterized in that said control block (8) comprises a module for detection of excess voltage (9) which generates an excess voltage signal (SA) representative of the presence of an excess voltage on said network (1) throughout the duration of the predetermined time constant TF.

12. Control system of a rotary electrical machine according to claim 9, characterized in that said control block (8) comprises a module for detection of passage through zero (10) which generates a signal of passage through zero (SB) representative of the vanishing of the said phase current (Iφ).

13. Control system of a rotary electrical machine according to claim 11, characterized in that said control block (8) additionally comprises:
   an AND logic gate (11) which generates a short-circuit command (SAND) at the output on the basis of said excess voltage signal (SA) and said signal of passage through zero (SB) at the input;
   a validation module (12), which generates a validated short-circuit command (SC), by authorizing the stoppage of, or inhibiting, said short-circuit command (SAND), on the basis of a second predetermined time T2 which is shorter than a first period necessary for detection of a phase fault by said electronic control and regulation circuit (6), and on the basis of a third predetermined time T3 which is longer than a second period necessary for re-initialization of said electronic control and regulation circuit (6);
   an OR logic gate (27) which generates said switching command (SOR) at the output on the basis of said validated short-circuit command (SC) and said automatic control command (O).

14. Control system of a rotary electrical machine according to claim 13, characterized in that said validation module (12) comprises a counter with a counting period which is equal to said second predetermined time T2 and a countdown counter with a countdown period equal to said third predetermined time T3.

15. Control system of a rotary electrical machine according to claim 9, characterized in that said control block (8) additionally comprises a memory comprising instructions which are representative of the method according to claim 1.

16. Polyphase rotary electrical machine which can operate as a generator, characterized in that it comprises a control system according to claim 9.

* * * * *